US007951239B2

(12) United States Patent
Trumbore et al.

(10) Patent No.: US 7,951,239 B2
(45) Date of Patent: May 31, 2011

(54) METHOD OF PRODUCING ROOFING SHINGLE COATING ASPHALT FROM NON-COATING GRADE ASPHALT

(75) Inventors: David C. Trumbore, Chicago, IL (US);
David R. Jones, IV, Tampa, FL (US);
Jason D. Guerra, Tinley Park, IL (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 975 days.

(21) Appl. No.: 11/823,634

(22) Filed: Jun. 28, 2007

(65) Prior Publication Data
US 2009/0000514 A1     Jan. 1, 2009

(51) Int. Cl.
*C08L 95/00* (2006.01)
(52) U.S. Cl. .................. 106/273.1; 106/270; 106/285
(58) Field of Classification Search .................. 106/270, 106/273.1, 285; 208/39, 44
See application file for complete search history.

(56) References Cited

U.S. PATENT DOCUMENTS

| | | | |
|---|---|---|---|
| 1,782,186 A | 11/1930 | Abson | |
| 2,179,208 A | 11/1939 | Burk et al. | |
| 2,200,914 A | 5/1940 | Burk et al. | |
| 2,375,117 A | 5/1945 | Lentz | |
| 2,450,756 A | 10/1948 | Hoiberg | |
| 2,649,384 A | 8/1953 | Anderson | |
| 2,762,755 A | 9/1956 | Kinnaird | |
| 3,126,329 A | 3/1964 | Fort | |
| 3,703,393 A | 11/1972 | Koons | |
| 4,328,147 A | 5/1982 | Chang et al. | |
| 4,338,137 A | 7/1982 | Goodrich | |
| 4,382,989 A | 5/1983 | Chang et al. | |
| 4,456,523 A | 6/1984 | Carlos et al. | |
| 4,497,921 A | 2/1985 | Chang et al. | |
| 4,544,411 A | 10/1985 | Wobles et al. | |
| 4,554,023 A | 11/1985 | Janicki | |
| 4,584,023 A | 4/1986 | Goodrich | |
| 4,659,389 A | 4/1987 | Wombles et al. | |
| 4,711,672 A | 12/1987 | Gorter et al. | |

(Continued)

FOREIGN PATENT DOCUMENTS

CA     1 260 653     9/1989

(Continued)

OTHER PUBLICATIONS

Trumbore, David et al., Emission Factors for Asphalt-Related Emissions in Roofing Manufacturing, Environmental Progress, Oct. 2005, 268-278, vol. 24, No. 3.

(Continued)

*Primary Examiner* — Robert J Hill, Jr.
*Assistant Examiner* — Brian McCaig
(74) *Attorney, Agent, or Firm* — MacMillan, Sobanski & Todd, LLC (57) ABSTRACT

A method of producing a roofing shingle coating asphalt from a non-coating grade asphalt feedstock includes the following steps. The non-coating grade asphalt feedstock is partially blown to lower its penetration to a first penetration that is within or close to a target penetration range of the coating asphalt, and to raise its softening point to a first softening point that is lower than a target softening point range of the coating asphalt. Then a wax is added to the partially blown non-coating grade asphalt to further raise its softening point to a second softening point that is within the target softening point range to produce the coating asphalt.

36 Claims, 5 Drawing Sheets

U.S. PATENT DOCUMENTS

| | | | |
|---|---|---|---|
| 4,780,146 A | 10/1988 | Chang | |
| 4,882,373 A | 11/1989 | Moran | |
| 4,885,210 A | 12/1989 | Vedove | |
| 5,059,300 A | 10/1991 | McGinnis | |
| 5,098,480 A | 3/1992 | McGinnis et al. | |
| 5,330,569 A | 7/1994 | McGinnis et al. | |
| 5,333,439 A * | 8/1994 | Bozich et al. | 53/450 |
| 5,393,811 A | 2/1995 | Moran et al. | |
| 6,060,550 A | 5/2000 | Simon et al. | |
| 6,120,913 A | 9/2000 | Kluttz et al. | |
| 6,258,255 B1 | 7/2001 | Gale et al. | |
| 6,414,056 B1 | 7/2002 | Puzic et al. | |
| 6,451,394 B1 | 9/2002 | Marzari et al. | |
| 6,588,974 B2 | 7/2003 | Hildebrand et al. | |
| 6,852,806 B2 | 2/2005 | Sasagawa et al. | |
| 6,913,416 B2 | 7/2005 | Hildebrand et al. | |
| 7,317,045 B2 | 1/2008 | Zanchetta et al. | |
| 7,371,805 B2 | 5/2008 | Sasagawa et al. | |
| 7,696,267 B2 | 4/2010 | Sasagawa et al. | |
| 2005/0107521 A1 | 5/2005 | Sasagawa et al. | |
| 2005/0234193 A1 | 10/2005 | Sasagawa et al. | |
| 2007/0054987 A1 | 3/2007 | Zanchetta et al. | |
| 2007/0054988 A1 | 3/2007 | Zanchetta et al. | |
| 2007/0131578 A1 | 6/2007 | Ruan et al. | |

FOREIGN PATENT DOCUMENTS

| | | |
|---|---|---|
| EP | 0 911 377 | 4/1999 |
| EP | 0911377 B1 | 5/2004 |
| GB | 1084486 | 9/1967 |

OTHER PUBLICATIONS

International Search Report dated Oct. 9, 2008 in PCT/US2008/068455.

International Search Report PCT/US2008/087464 dated April 22, 2009.

Office Action issued in U.S. Appl. No. 12/002,681, filed Dec. 18, 2007, mailing date Aug. 31, 2010.

Office Action issue in U.S. Appl. No. 12/002,648, filed Dec. 18, 2007, mailing date Apr. 5, 2010.

* cited by examiner

METHOD OF PRODUCING ROOFING SHINGLE COATING ASPHALT FROM NON-COATING GRADE ASPHALT

TECHNICAL FIELD AND INDUSTRIAL APPLICABILITY OF THE INVENTION

This invention relates in general to methods of producing asphalt roofing products, and in particular to a method of producing roofing shingle coating asphalts from non-coating grade asphalts such as commodity paving asphalts.

BACKGROUND OF THE INVENTION

Roofing shingle coating asphalts are usually produced by selecting a suitable feedstock asphalt and then processing that asphalt to provide the properties desired for use in a coating asphalt. For example, asphalt feedstocks used to produce coating asphalts for roofing shingles are usually chosen so that they can be air-blown to: 1) raise their softening point so that they maintain their dimensions at high temperatures on a roof; 2) lower their penetration into a range where it allows proper press of granules without becoming too brittle; 3) raise their melt viscosity so that when filler is added the filled coating viscosity is in a range that allows a roofing shingle process to run at high speeds; and 4) create a shingle that will perform over many years on the roof in spite of being exposed to sun, high temperatures and rain.

Historically coating asphalt for roofing shingles has been produced by choosing a special grade of asphalt as the feedstock to the air blowing process in order to meet these properties. These special grades of asphalt were often materials that were softer (higher penetration, lower viscosity) than paving grade asphalt and were often called "roofer's flux". Unfortunately, these special grades of asphalts that can be air-blown to make coating asphalts are increasingly in short supply and therefore can be costly compared to many other types of asphalts, particularly commodity paving asphalts. A new method that could use non-coating grade asphalts, such as commodity paving asphalts or other asphalts that are harder than the normal special grades of asphalt, to produce quality coating asphalts for roofing shingles would be beneficial to the asphalt roofing product business.

BACKGROUND ART

Asphalts have been modified with waxes to produce a variety of roofing and industrial products. For example, Chang et al. (U.S. Pat. No. 4,382,989) discloses a roofing asphalt formulation containing oxidized coating grade asphalt, oxidized polyethylene and optionally saturant asphalt and filler. In one embodiment, the asphalt is oxidized to any degree, then unoxidized polyethylene is added, and then the oxidation process is continued to produce the roofing asphalt formulation. In a later improvement Chang et al. (U.S. Pat. No. 4,497,921) added sulfur to stabilize the mix. Janicki (U.S. Pat. No. 4,554,023) claimed a method of making a roofing shingle asphalt by blending bis-stearoylamide wax into asphalt, including blown asphalt, particularly asphalts with 143° F. softening points, with a benefit of lowering the viscosity of the asphalt product. None of these techniques consistently met specifications for roofing shingle coating asphalts and were usable with many asphalts.

There still exists a need for a method of producing coating asphalts for roofing shingles from non-coating grade asphalts such as commodity paving asphalts.

SUMMARY OF THE INVENTION

The invention relates to a method of producing a roofing shingle coating asphalt from a non-coating grade asphalt feedstock comprising the following steps. In an embodiment, the non-coating grade asphalt feedstock is partially blown to lower its penetration to a first penetration that is preferably within or close to a target penetration range of the coating asphalt, and to raise its softening point to a first softening point that is lower than a target softening point range of the coating asphalt. A blowing catalyst is preferably added to the non-coating grade asphalt before or during the blowing. Then a wax is added to the partially blown non-coating grade asphalt to further raise its softening point to a second softening point that is within the target softening point range to produce the coating asphalt.

In another embodiment, the method is performed as described above but without the addition of the blowing catalyst.

In another embodiment, the non-coating grade asphalt feedstock is blown. A blowing catalyst is added to the non-coating grade asphalt before or during the blowing. Then a wax is added to the asphalt to produce the coating asphalt. The method provides independent control of the softening point, penetration, and melt viscosity of the coating asphalt while delivering excellent stain index and storage stability.

In a further embodiment, a coating asphalt for use in roofing shingles comprises an asphalt feedstock, which when blown to a softening point above 190° F. (88° C.) has a penetration at 77° F. (25° C.) below 15 dmm. The feedstock has been partially blown to a penetration at 77° F. (25° C.) above 15 dmm and a softening point having a first value below 190° F. (88° C.). The coating asphalt further comprises a wax added to the partially blown feedstock. When the wax is added, the resulting coating asphalt has a softening point above 190° F. (88° C.) and a penetration at 77° F. (25° C.) above 15 dmm.

Various aspects of the method will become apparent to those skilled in the art from the following detailed description of the preferred embodiments, when read in light of the accompanying drawings.

DETAILED DESCRIPTION AND PREFERRED
EMBODIMENTS OF THE INVENTION

As used herein the term "asphalt" is meant to include asphalts produced from petroleum refining, including residua from atmospheric distillation, from vacuum distillation, and from solvent deasphalting units. Mixtures of different asphalts can also be used. The invention can also be used with natural bitumen like the products extracted from the oil sands in Alberta or asphalts derived from oil sands by various refinery processes.

By "roofing shingle coating asphalt" or "coating asphalt", as used herein, is meant an asphalt that is suitable for use as a coating asphalt to make asphalt roofing shingles as defined by ASTM D 3462. The ASTM method sets forth the following specifications: softening point minimum of 190° F. (88° C.) and maximum of 235° F. (113° C.), and penetration at 77° F. (25° C.) minimum of 15 dmm.

In one embodiment, the "coating asphalt" meets one or more of the tighter specifications typically used by shingle manufacturers. Some examples of these specifications include a softening point of 200° F. (93° C.) to 215° F. (102° C.), a penetration at 77° F. (25° C.) of 16 dmm to 22 dmm, a melt viscosity at 400° F. (204° C.) of 150 cps to 400 cps, a durability of greater than 60 cycles in the weatherometer, and a flashpoint of greater than 550° F. (288° C.). Other examples include a softening point of 212° F. (100° C.) to 220° F. (104° C.), a penetration at 77° F. (25° C.) of 16 dmm to 20 dmm, a melt viscosity at 400° F. (204° C.) of 275 cps to 375 cps, and a flashpoint of greater than 550° F. (288° C.). In some manufacturers' specifications, a specific target penetration of 15 dmm or 17 dmm is used. There are a range of different manufacturer specifications. In addition manufacturers often specify other properties like stain index, as well as proprietary tests that characterize rheology or durability.

The properties of the asphalt can be measured by any suitable tests. In the description provided herein, the asphalt properties are measured as follows: softening point or SP by ASTM D36; penetration or pen by ASTM D5 run at 25° C.; melt viscosity or visc by ASTM D4402 run at 400° F. (204° C.) with a Model LV Brookfield Viscometer, using a no. 18 spindle, 6 RPM or a Model RV Brookfield Viscometer, using a no. 21 spindle, 50 RPM; durability by ASTM D4798; flashpoint by ASTM D92; stain index by ASTM D2746; and stability by ASTM D3791 modified to run at oven temperature of 260° C. for up to 5 days or similar test procedure.

In a specific embodiment, the coating asphalt meets the ASTM specifications for softening point and penetration and the manufacturers' specification for melt viscosity. In a more specific embodiment, the coating asphalt additionally meets the manufacturers' specification for durability and/or for stability.

By "non-coating grade asphalt", as used herein, is meant an asphalt that cannot be air blown to the ASTM softening point and penetration specifications for a coating asphalt. For example, the non-coating grade asphalt which is blown to a suitable softening point may have a penetration that is too low. In one embodiment, an asphalt grade that cannot be air blown to the manufacturers' specification for melt viscosity is also classified as a non-coating grade asphalt. For example, if a catalyst is used during air blowing to raise the penetration of the asphalt it may blow to a melt viscosity above the specification maximum. Typically an asphalt that is not able to be used as feedstock for the air blowing process to make coating asphalt is lower penetration and higher viscosity as produced in the refinery.

In one embodiment, the "non-coating grade asphalt" is a paving grade asphalt or a mixture of different paving grade asphalts. Commodity paving asphalts are projected to remain in good supply for the foreseeable future and are typically less costly than coating grade asphalts such as roofer's fluxes. Paving asphalts typically are harder (lower penetration) and higher in softening point and viscosity than the asphalts typically used as feedstock to the air blowing process to make shingle coating asphalt. Typical of paving asphalts are the straight run asphalts derived from the atmospheric and vacuum distillation of crude oils, or are made by blending vacuum tower residua with residua from solvent deasphalting units.

Any suitable paving asphalt(s) can be used, for example paving asphalts which meet the PG64-22 specifications (AASHTO M320). PG64-22 is by far the most common paving specification in the United States. Paving asphalts were previously graded by viscosity and a common asphalt that is similar to the PG64-22 grade and usable in this method is the old AC20 grade (ASTM D3381). Some other examples of paving asphalts that may be suitable include PG67-22, PG-70-22, PG58-22, PG70-16, PG70-10, PG67-10, pen grade 40-50, pen grade 60-70, pen grade 85-100, pen grade 120-150, AR4000, AR8000, and AC30 grade.

In one embodiment, the method provides an advantage of being useful for producing coating asphalts from a wide array of different types of paving asphalts. For example, in one embodiment the method is suitable for use with all of the above-listed paving asphalts.

In another embodiment, the non-coating grade asphalt which is used as the asphalt feedstock of the present method (the asphalt before adding a catalyst and a wax during the method as described below) consists essentially of just the asphalt. In a further embodiment, the coating asphalt which is produced by the present method consists essentially of just the asphalt, catalyst and wax. By "consists essentially" is meant that other materials that would significantly modify the properties of the asphalt are not included. However, in other embodiments of the method any such materials can optionally be added, such as polymers or different asphalts, consistent with producing the desired coating asphalt product.

The blowing process is an oxidizing process that comprises blowing an oxygen-containing gas (for example, air, oxygen or an oxygen-inert gas mixture) through the asphalt at an elevated temperature. The process involves loading the asphalt feedstock into a converter (oxidizer) at any suitable temperature, for example, a temperature of from about 200° C. to about 230° C. The gas is bubbled or blown through the molten asphalt. The reaction produced by the blowing is exothermic and raises the temperature of the asphalt to any suitable blowing temperature, for example, a temperature of from about 250° C. about 265° C. The maximum temperature is usually controlled by a water-cooled jacket. The process is usually carried out at ambient pressure, although it can also be carried out at elevated pressure. Also, the process is usually carried out in batches, although it can also be carried out continuously. The processing time of a standard blowing process may take from about 1 hour to about 15 hours to reach the final softening point. The processing time is dependent on the process temperature, the gas flow rate, the characteristics of the asphalt, the design of the process equipment, the concentration of oxygen in the gas, and the desired product.

Several catalysts are suitable for use in the air blowing process to either speed up the reaction or to create a final product with a higher penetration. Common catalysts are ferric chloride and phosphoric acid.

A feature of the standard air blowing process is the fact that once the input raw materials are chosen, and a catalyst is chosen, the penetration and viscosity of the final product are entirely dependent on the softening point to which the product is air blown. In such a standard process there are no effective ways to adjust the product to make higher or lower viscosities or penetrations after the material choice is made.

The blowing process generates flue gases typically containing hydrogen sulfide, sulfur oxides ($SO_x$), organosulfur compounds, hydrocarbons, nitrogen oxides ($NO_x$), carbon monoxide, and water. When ferric chloride is used as a catalyst the flue gases also contain hydrogen chloride. Prior to release into the atmosphere, the flue gases are typically passed through a water-sealed knockout tank and then subjected to an incineration process to control the emissions of volatile organic compounds (VOC's). In that process the sulfur compounds are all oxidized to sulfur oxides and the carbon monoxide is oxidized to carbon dioxide. The energy used to incinerate these fumes and the emissions that remain after incineration both increase as the processing time increases.

In a first step of the present method, the non-coating grade asphalt feedstock is partially blown to lower its penetration to a first penetration that is within or close to a target penetration range of the coating asphalt. The target penetration range is the range that meets the ASTM specification for the coating asphalt, which is a minimum penetration at 77° F. (25° C.) of 15 dmm. The target range may also include a maximum penetration of 22 dmm. By "within or close to" the target range is generally meant a penetration at 77° F. (25° C.) within a range of from about 13 dmm to 24 dmm. In some embodiments, such as when a manufacturer's specification includes a target penetration of 15 dmm, "within or close to" the target can mean a penetration within a range of about 13 dmm to 20 dmm. In other embodiments, such as when a manufacturer's specification includes a target penetration of 17 dmm, this can mean a penetration within a range of about 15 dmm to 23 dmm.

Because of the nature of non-coating grade asphalts, blowing to a penetration within or close to the target penetration range will result in a asphalt that has an intermediate or first softening point that is lower than a target softening point range. Whereas a conventional air-blowing process involves blowing the asphalt until it reaches a desired softening point, the present invention includes a partial blowing step which stops blowing the asphalt before it has reached this softening point.

The "target softening point range" is the range that meets the ASTM specification for the coating asphalt, which is a softening point within a range of from 190° F. (88° C.) to 235° F. (113° C.). The intermediate or first softening point that results from the partial blowing step is lower than the target softening point range. In one embodiment it is significantly lower although such is not necessary. For example, the first softening point may be within a range of from about 140° F. (60° C.) to about 185° F. (85° C.) depending on the particular non-coating grade asphalt used and depending on whether or not phosphoric acid or some other catalyst is used during blowing. In one embodiment, the first softening point is within a range of from about 160° F. (71° C.) to about 175° F. (79° C.).

Figure 2:
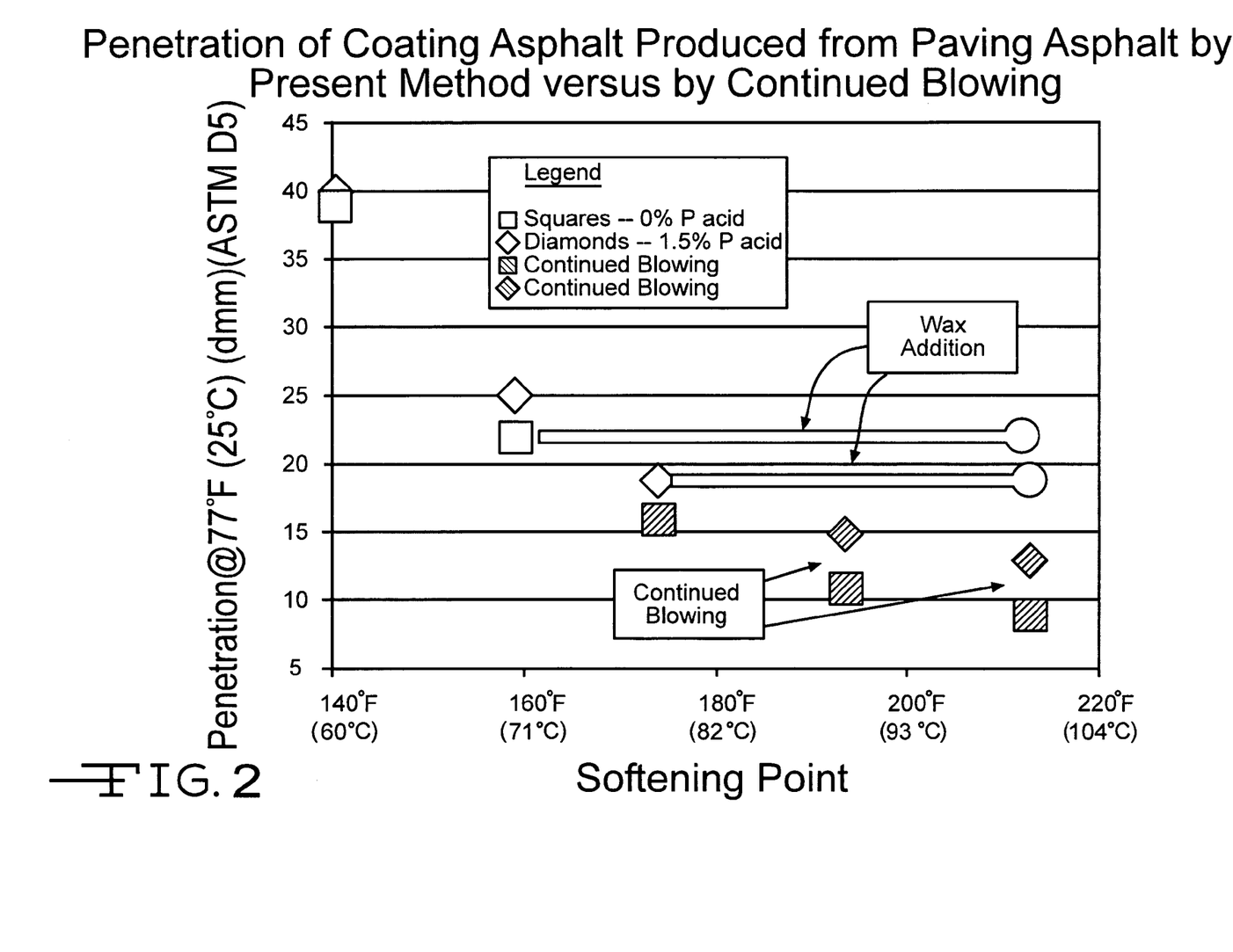
FIG. 2 is a plot of penetration versus softening point during the production of a coating asphalt from a paving asphalt. The plot shows the different results of producing the coating asphalt according to the present method versus by continuing to blow the asphalt to the final softening point. The present method stops the air blowing early when the penetration is close to the penetration desired in the final product and adds a wax to achieve the final softening point.

A second step in an embodiment according to the present invention adds a wax to the intermediate softening point product with the result that the softening point is increased to the target softening point range while maintaining a penetration within the desired range. This is illustrated in FIG. 2. In other embodiments the wax addition can lower or raise the penetration as it increases the softening point. In the case of a wax addition that lowers the penetration, the partial blowing step of the method would be stopped at a higher penetration value and hence lower softening point value. In that case the wax addition step described below further lowers the penetration to a second penetration that is within the target penetration range. Note that FIG. 2 also shows what the penetration would be with continued blowing instead of wax addition. In one embodiment, the asphalt may be further blown after the wax addition and/or other additives may be added.

In one embodiment, a blowing catalyst is added to the non-coating grade asphalt before or during the partial blowing process. Another embodiment does not include the catalyst addition step. Any type of blowing catalyst, or a mixture of different blowing catalysts, capable of functioning as described herein can be used in the method. Some examples of blowing catalysts that may be suitable include phosphoric acid, ferric chloride, phosphorus pentoxide, aluminum chloride, hydrohalic acid, and boric acid. In one embodiment, the blowing catalyst is phosphoric acid and/or ferric chloride. For example, ferric chloride can be used to speed up the air blowing process and to create a final product with a higher penetration.

Figure 1:
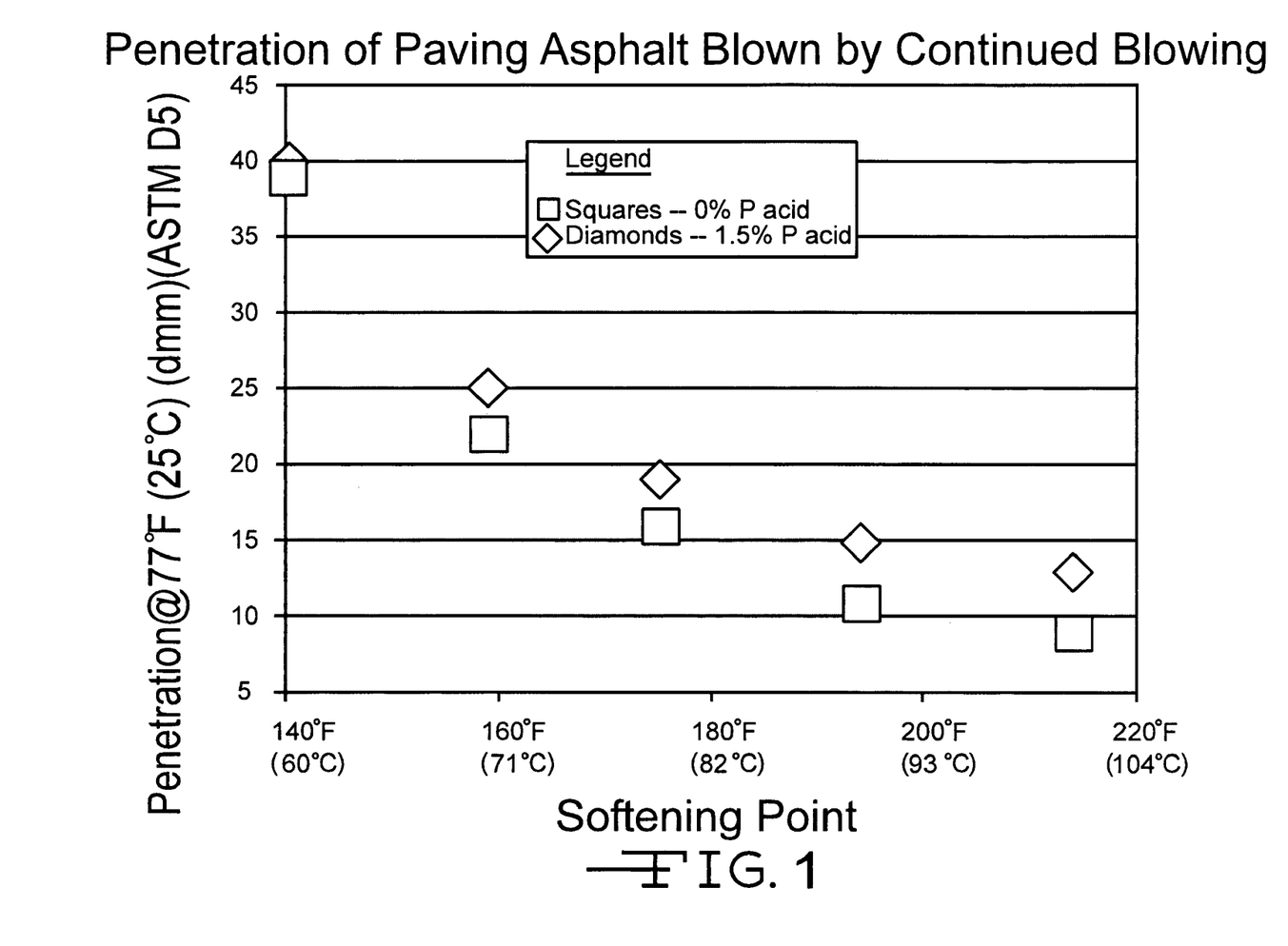
FIG. 1 is a plot of penetration versus softening point during the air blowing of a paving asphalt by continued blowing both with and without phosphoric acid. The plot shows that when the paving asphalt is blown to a softening point within a range suitable for use as a coating asphalt for a roofing shingle (a range of 190° F. (88° C.) to 235° F. (113° C.)), the penetration of the asphalt is borderline or too low to be suitable for use as a coating asphalt (having a minimum penetration of 15 dmm). The addition of the phosphoric acid increases the penetration at a given softening point, but the penetration is still too low for the asphalt blown to the final softening point.
Figure 3:
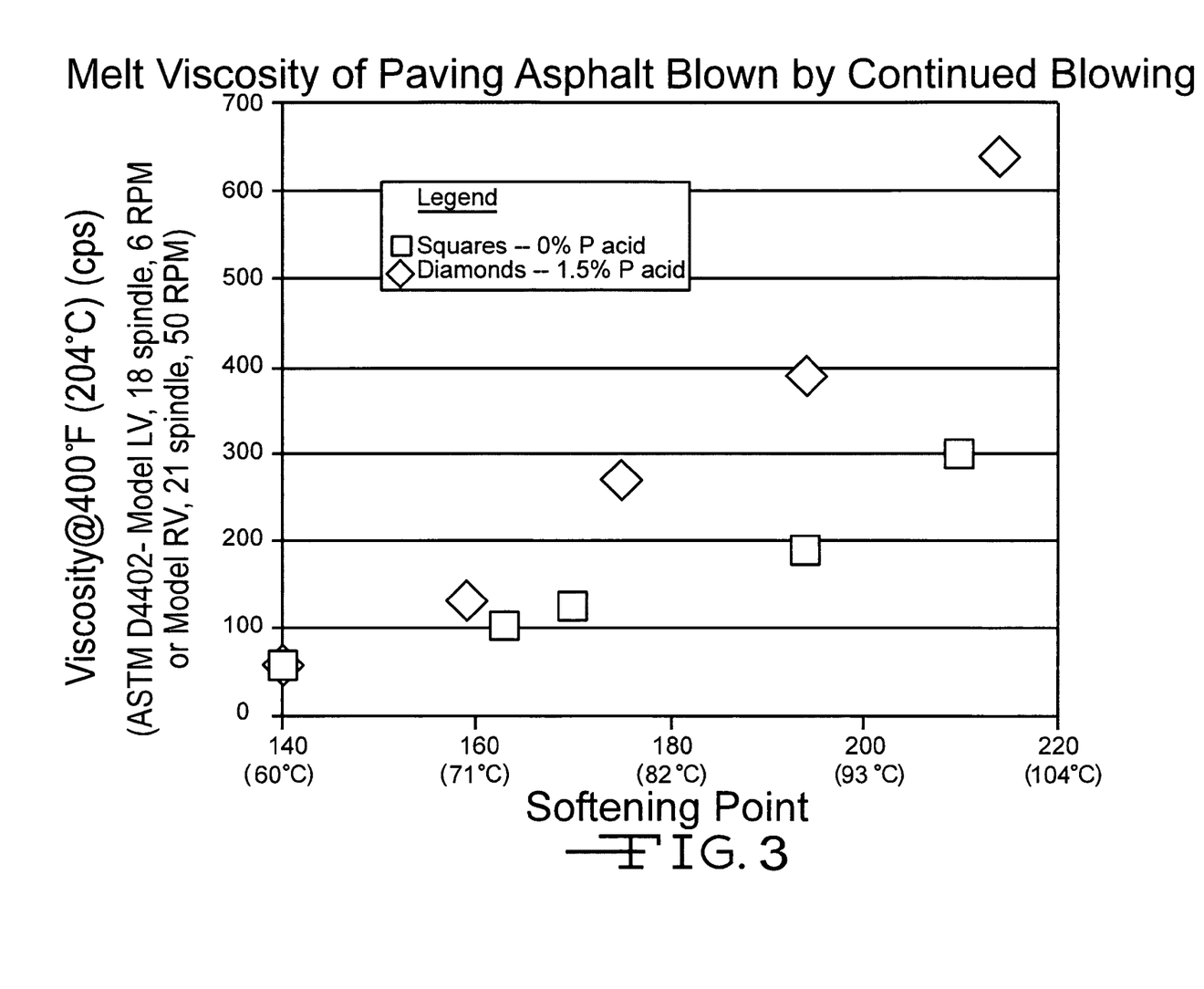
FIG. 3 is a plot of melt viscosity versus softening point during the air blowing of a paving asphalt by continued blowing both with and without phosphoric acid. The plot shows that when the paving asphalt is blown to a softening point range suitable for use as a coating asphalt (a range of 190° F. (88° C.) to 235° F. (113° C.)), the melt viscosity of the asphalt is borderline or too high to meet manufacturer specs for use as a coating asphalt (a range of 150 cps to 400 cps) when it is blown with phosphoric acid.

Phosphoric acid (regardless of concentration) can also be used to just soften the product. The impact on penetration of air blowing a typical commodity paving asphalt with and without phosphoric acid as a catalyst is shown in FIG. 1. The impact on melt viscosity is shown in FIG. 3. The phosphoric acid can be provided in any suitable form, or a mixture of different forms of phosphoric acid. For example, some different forms include phosphoric acid, polyphosphoric acid, superphosphoric acid, orthophosphoric acid, pyrophosphoric acid and triphosphoric acid. Some examples of different forms of phosphoric acid and other catalysts are disclosed in U.S. Patent Application Pub. No. 2007/0131578 A1 which is incorporated by reference herein. When the term "phosphoric acid" is used in the description and claims herein it includes all different forms of phosphoric acid.

The blowing catalyst can be added in any suitable amount. In one embodiment with phosphoric acid used as the catalyst, it is added in an amount within a range of from about 0.5% to about 5% of active phosphoric acid weight by total weight of the asphalt and catalyst, and typically from about 1% to about 2%. For example, if the target is to include 5% active phosphoric acid in an asphalt/phosphoric acid mix weighing 100 grams, this could be added in the form of 5 grams of 100% phosphoric acid, 5.88 grams of 85% phosphoric acid, or 4.35 grams of 115% polyphosphoric acid.

Figure 4:
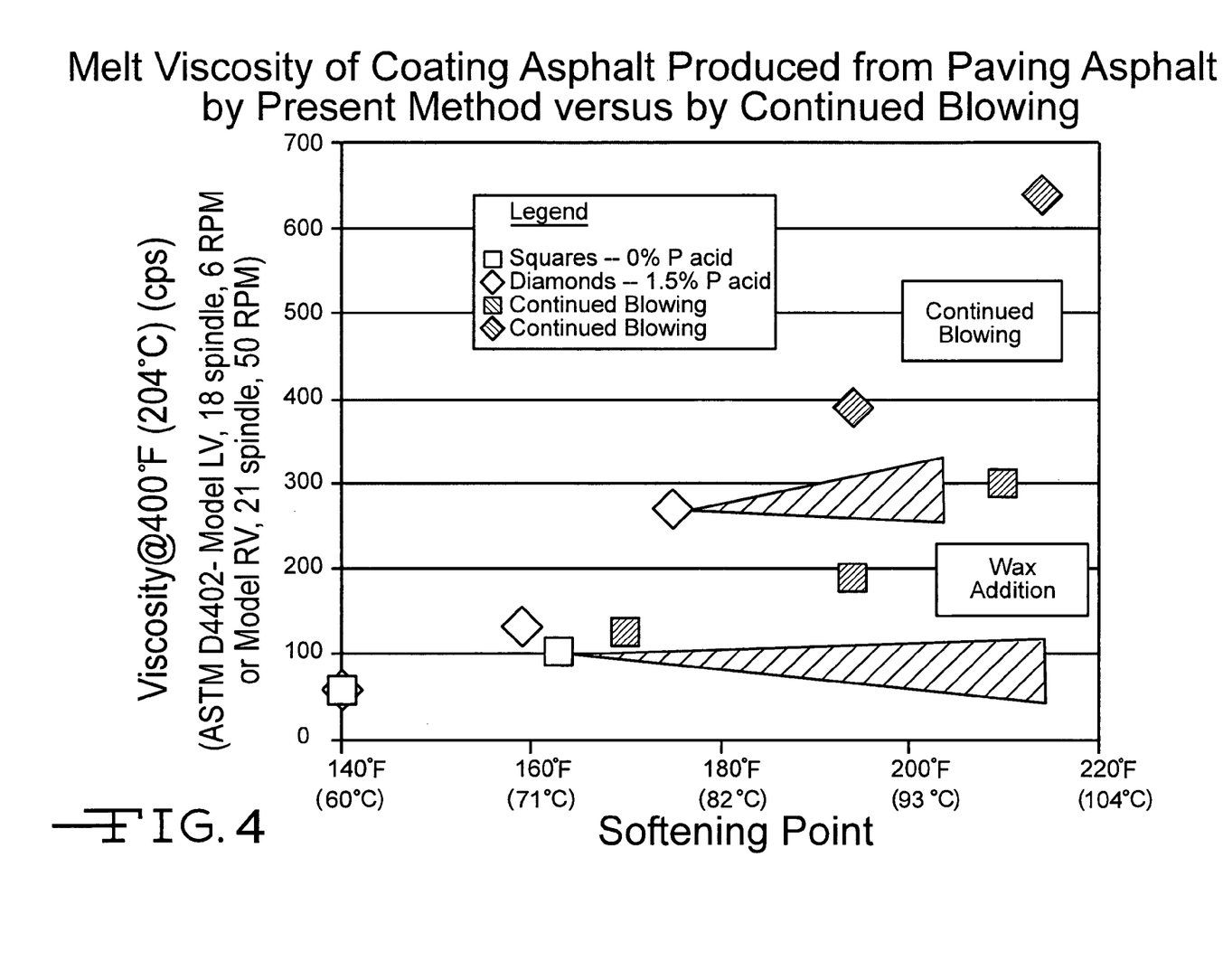
FIG. 4 is a plot of melt viscosity versus softening point during the production of a coating asphalt from a paving asphalt. The plot shows the different results of producing the coating asphalt according to the present method versus by continuing to blow the asphalt to the final softening point. The present method stops the air blowing early when the viscosity is still close to the viscosity desired in the final product and less than the maximum spec so that the wax advances the softening point without a large impact on viscosity. In one embodiment, a wide range of final viscosities can be achieved by varying the concentration of phosphoric acid.
Figure 5:
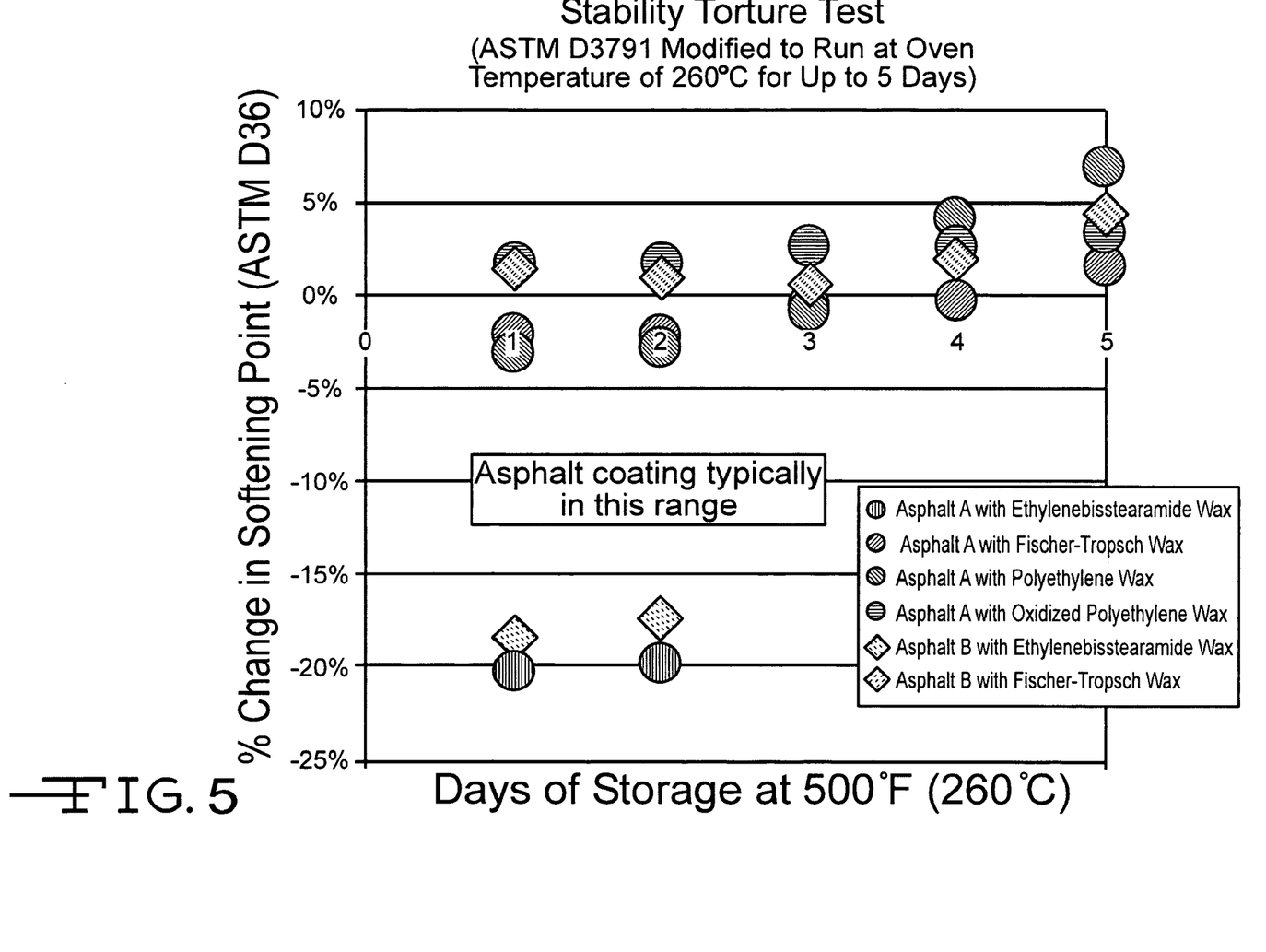
FIG. 5 is a plot of the percent change in softening point as a result of storing a coating asphalt at high temperatures, the asphalt having been prepared according to one embodiment of the present method. It shows the superior resistance to property change under heat, a common problem with standard asphalt coatings.

Most unblown asphalts will have a melt viscosity that is far too low to be used as shingle coating. The partial blowing step raises the melt viscosity of the asphalt. In one embodiment, the more blowing catalyst is used the more the melt viscosity is raised. This is shown in the attached FIG. 4. The use of catalyst can therefore be a means of changing the viscosity of the intermediate asphalt product over a wide range to meet customer specifications. As shown in FIG. 4, step 2 of the process, the addition of wax to achieve the desired product softening point, modifies the viscosity a much smaller amount than continuing the blowing process and the choice of wax can slightly raise or slightly lower the viscosity of the intermediate product.

Thus, the method produces a coating asphalt having the desired properties without the necessity of a complete blowing process, and it provides the means to produce different viscosities by using more or less catalyst, and different penetrations by choosing the extent of the initial blowing step.

Any type of wax, or a mixture of different waxes, capable of functioning as described herein can be used in the method. In one embodiment, the wax has a high congealing point or a high drop melt point of at least about 75° C., specifically at least about 90° C., and more specifically at least about 100° C. When referring to wax testing we will use "melt point" to refer broadly to either congealing point or drop melt point, which are defined by ASTM D 938 in the case of congealing point and ASTM D 3954 in the case of drop melt point. Also wax can be characterized by penetration or hardness (ASTM D5 or ASTM D 1321), density (ASTM D1505), viscosity (ASTM D 4402 or ASTM D88), or acid value (ASTM D 1386).

The wax can be a functionalized or synthetic wax or a naturally occurring wax. The wax can be oxidized or non-oxidized. Some examples of synthetic waxes that may be suitable include ethylene bis-stearamide wax (EBS), Fischer-Tropsch wax (FT), oxidized Fischer-Tropsch wax (FTO), polyolefin waxes such as polyethylene wax (PE), oxidized polyethylene wax (PEO), polypropylene wax, polypropylene/polyethylene wax, alcohol wax, silicone wax, petroleum waxes such as microcrystalline wax or paraffin, and other synthetic waxes. Some examples of functionalized waxes include amine waxes, amide waxes, ester waxes, carboxylic acid waxes, and microcrystalline waxes.

The naturally occurring wax can be derived from a plant, animal or mineral. Some examples of natural waxes that may be suitable include plant waxes such as candelilla wax, carnauba wax, rice wax, Japan wax and jojoba oil; animal waxes such as beeswax, lanolin and whale wax; and mineral waxes such as montan wax, ozokerite and ceresin.

Certain types of waxes may be most effective for use with certain types of non-roofing asphalts. In one embodiment, the wax is Fischer-Tropsch wax with a melt point of greater than 100° C. and a hardness at 25° C. from 1 dmm to a value so soft that it could not be measured by the techniques in ASTM D5. In another embodiment the wax is a polyethylene wax with a melt point of 100 to 125° C., a hardness at 25° C. of 1 to 7 dmm, a density of from 0.91 to 0.95 gm/cc, a viscosity of 20 to 450 cps at 140° C., and a nil acid number. In a third embodiment the wax is an oxidized polyethylene wax with melt point of 135 to 140° C., hardness<0.5 dmm, viscosity of 3600 to 4500 at 150° C., and acid number of 30.

Any suitable mixtures of different waxes can also be used. For example, the wax can include a blend of a Fischer-Tropsch wax and a polyethylene wax.

The wax can be added in any suitable amount. In one embodiment, it is added in an amount within a range of from about 0.5% to about 8% by total weight of the wax, the blowing catalyst and the asphalt, and typically from about 1% to about 4%.

In one embodiment the step of partially blowing with a form of phosphoric acid as the blowing catalyst and the wax addition step was observed to have a synergistic effect in raising the softening point of the asphalt. It is postulated that any form of phosphoric acid may have this synergistic effect. Phosphoric acid is shown in the examples to be more effective than other catalysts tested. With phosphoric acid as the catalyst there is more of an increase in softening point with the same addition of wax, with less drop in penetration, and a greater increase in viscosity. While not intending to be limited by theory, it is believed that phosphoric acid or polyphosphoric acid and the wax may act to form intermolecular bonds in the asphalt that make the asphalt appear to be higher molecular weight in the solid state than in the liquid state. In certain embodiments, this synergy improves the ability of the method to produce a coating asphalt from many different types of non-coating grade asphalts.

In one embodiment, the coating asphalt which has been partially blown and wax added has improved weatherability compared to the same asphalt which has been completely blown to the desired softening point without the wax addition, and all other conditions being the same. However, the improved weatherability is not a required result. The improved ability to resist degradation due to the weather (sun, rain, wind, etc.) increases the useful life of roofing products made with the asphalt. The weatherability can be measured by any suitable method, for example, the accelerated weathering test described in ASTM D4798.

In one embodiment, the method produces a coating asphalt having good stain index (ASTM 2746), although such is not necessary. The use of commodity paving asphalts as the feedstock may improve the stain index of the product made by the method.

The partial blowing process may significantly reduce blow time and hence both energy costs and air emissions compared to a complete blowing process, although such is not necessary. In one embodiment, the blow time is reduced by at least about 20% compared to a method in which a feedstock asphalt from a similar crude is blown directly to the desired softening point. The energy cost that would be saved is associated with the cost of incinerating fumes from the blowing process. The energy for incineration is proportional to the amount of air incinerated which is proportional to the air blowing time, and the air blowing time is proportional to the amount of processing needed the change in properties. The emissions from air blowing of asphalt are also proportional to the amount of processing used to change the properties of the asphalt. The partial rather than full blowing step will therefore reduce both energy and emissions.

In another embodiment, the method is a multistep process that provides independent control of softening point, penetration, melt viscosity and stiffness/flexibility of the coating asphalt. This allows a wide variety of non-coating grade asphalts to be processed into coating asphalts and allows more varied specifications for coating to be met. The method comprises the steps of: blowing the non-coating grade asphalt; adding a blowing catalyst, if desired, to the non-coating grade asphalt before or during the blowing; and then adding a wax to the non-coating grade asphalt to produce the coating asphalt. In one embodiment, the blowing step is a partial blowing process as described above.

In this method, the properties of penetration, melt viscosity, and softening point have individual adjustments that can be done that make the properties substantially independent and allow great flexibility in using any non-coating grade asphalt. In various embodiments, the blowing step controls the penetration of the coating asphalt product, the amount of blowing catalyst added controls the melt viscosity of the coating asphalt, and the type and amount of the wax added controls the softening point of the coating asphalt. By "controls" is meant that these method steps affect at least in large part the properties of the coating asphalt, although other factors may also be involved. The above description relating to the first embodiment explains in more detail how these method steps can control the resulting product properties. In one embodiment, the product coating asphalt has excellent stain index and storage stability as defined above.

It is also envisioned that the method could be used to produce an asphalt that does not meet the specifications of a coating asphalt, but this asphalt product could be blended with other asphalt(s) or other material(s) to produce the coating asphalt. For example, the softening point and/or the penetration of the asphalt product might not meet coating asphalt specifications, but the product could be blended with other asphalt to produce the coating asphalt. For example, an asphalt product made by the present method not meeting specifications could be blended with a coating asphalt in any suitable proportions to produce a product that does meet coating asphalt specifications.

In a further embodiment, a coating asphalt for use in roofing shingles comprises an asphalt feedstock, which when blown to a softening point above 190° F. (88° C.) has a penetration at 77° F. (25° C.) below 15 dmm. The feedstock has been partially blown to a penetration at 77° F. (25° C.) above 15 dmm and a softening point having a first value below 190° F. (88° C.). The coating asphalt further comprises a wax added to the partially blown feedstock. When the wax is added, the resulting coating asphalt has a softening point above 190 F (88° C.) and a penetration at 77° F. (25° C.) above 15 dmm. In one embodiment, the coating asphalt further comprises a blowing catalyst added before or during the partial blowing. For example, the blowing catalyst may be phosphoric acid or any of the other above-mentioned blowing catalysts. In a particular embodiment, the asphalt feedstock is a paving grade asphalt. The coating asphalt meets ASTM specifications for coating asphalt suitable for roofing shingles. In a specific embodiment, the coating asphalt also has a melt viscosity at 400° F. (204° C.) of 150 cps to 400 cps.

The following examples show that the method of the invention can be used to produce coating asphalts from different types of commodity paving asphalts.

EXAMPLE 1

Source A PG64-22 paving asphalt from the refining of Canadian crude oils is used as the starting asphalt. With the standard blowing process this material blows to a 211° F. (99° C.) softening point with a 6 dmm pen, much too hard a pen to make coating grade asphalt. The material can be made to a soft enough pen when blown with 2% phosphoric acid resulting in a softening point of 212° F. (100° C.) and a pen of 22 dmm but the melt viscosity is much too high at 704 cps. So with standard processes this material is not able to be made into coating. However with the method described in this invention the paving asphalt is partially blown with 1.5% phosphoric acid to a softening point of 172° F. (78° C.), 18 dmm pen and then a variety of waxes, shown below, can be added to the partially blown material to use this material to make coating asphalt.

Source A PG64-22 asphalt from Canadian crude blown to 172° F. (78° C.) SP with 1.5% active polyphosphoric acid catalyst then:

| Wax Added | Wax Type | Wax % | SP | pen | visc | SP Stability* |
|---|---|---|---|---|---|---|
| Bareco PX105 | Fischer Tropsch | 3% | 207 F. (97 C.) | 16 dmm | 210 cps | −0.7% |
| OR Honeywell AC6 | Polyethylene (PE) | 3% | 203 F. (95 C.) | 16 dmm | 366 cps | −0.9% |
| OR Honeywell AC392 | Oxidized PE | 3% | 206 F. (97 C.) | 15 dmm | 372 cps | +2.6% |

*(ASTM D3791 modified to run at oven temperature of 260° C. for up to 5 days with softening point used as the property test)

EXAMPLE 2

Source B PG64-22 paving asphalt from the refining of Arab crude oils is used as the starting asphalt. With the standard blowing process this material blows to a 210° F. (99° C.) softening point with a 7 pen or much too hard for coating. Even with 1.5% phosphoric the pen at 214° F. (101° C.) SP is still too hard at 13 and the viscosity is much too high 640 cps. So with standard processes this material is not able to be made into coating. However with the method described in this invention the paving asphalt is partially blown with 1.5% phosphoric acid to a softening point of 172° F. (78° C.), 19 dmm pen and then a variety of waxes, shown below, can be added to the partially blown material to use this material to make coating asphalt.

Source B PG64-22 asphalt from Arab crude blown to 172° F. (78° C.) SP with 1.5% active polyphosphoric acid catalyst then:

| Wax Added | Wax Type | Wax % | SP | pen | visc | SP Stability* |
|---|---|---|---|---|---|---|
| Bareco PX105 | Fischer Tropsch | 2% | 202 F. (94 C.) | 18 dmm | 202 cps | 0.5% |
| OR Honeywell AC6 | Polyethylene (PE) | 2.5% | 206 F. (97 C.) | 18.5 dmm | 349 cps | N/A |
| OR Honeywell AC392 | Oxidized PE | 2% | 211 F. (99 C.) | 17.5 dmm | 416 cps | N/A |
| OR Honeywell AC617 | Polyethylene | 3% | 204 F. (96 C.) | 18.5 dmm | 304 cps | N/A |

*(ASTM D3791 modified to run at oven temperature of 260° C. for up to 5 days with softening point used as the property test)

EXAMPLE 3

Source C PG64-22 paving asphalt from the refining of Texas crude oils is used as the starting asphalt. With the standard blowing process this material blows to a 209° F. (98° C.) softening point with a pen of 9 dmm and a viscosity of 249 cps. The material can be made to a nearly soft enough pen (15) when blown with 1.5% phosphoric but the melt viscosity is too high at 430 cps. So with standard processes this material is not able to be made into coating. However with the method described in this invention the paving asphalt is partially blown with 1.5% phosphoric acid to a softening point of 165° F. (74° C.), 26 dmm pen and then a variety of waxes, shown below, can each be added to the partially blown material to use this material to make coating asphalt.

Source C PG64-22 asphalt from Texas crude blown to 165° F. (74° C.) SP with 1.5% active polyphosphoric acid catalyst then:

| Wax Added | Wax Type | Wax % | SP | pen | visc |
|---|---|---|---|---|---|
| Bareco PX105 | Fischer Tropsch | 3% | 191 F. (88 C.) | 20 dmm | 131 cps |
| OR Honeywell AC6 | Polyethylene (PE) | 3% | 206 F. (97 C.) | 21 dmm | 218 cps |
| OR Honeywell AC392 | Oxidized PE | 3% | 216 F. (102 C.) | 21 dmm | 214 cps |

EXAMPLE 4

Source C was also partially blown with 1.5% active phosphoric acid catalyst to 175-177° F. (79-81° C.) SP and 19-21 dmm pen. Then the following waxes were added separately.

| Wax Added | Wax Type | Wax % | SP | pen | visc |
|---|---|---|---|---|---|
| Bareco PX105 | Fischer Tropsch | 2% | 204 F. (96 C.) | 17 dmm | 197 cps |
| OR Honeywell AC6 | Polyethylene (PE) | 2.5% | 217 F. (103 C.) | 18 dmm | 281 cps |
| OR Honeywell AC392 | Oxidized PE | 2% | 213 F. (101 C.) | 17.5 dmm | 256 cps |
| OR Honeywell AC617 | Polyethylene | 3% | 202 F. (94 C.) | 18 dmm | 240 cps |
| OR Honeywell AC16A | Polyethylene | 2% | 220 F. (104 C.) | 17 dmm | 373 cps |
| OR Honeywell AC16A | Polyethylene | 1% | 204 F. (96 C.) | 17 dmm | 349 cps |

EXAMPLE 5

Source A PG64-22 was also blown to 167° F. (75° C.) SP and 19 pen with 0.5% ferric chloride as a blowing catalyst. Then the following waxes were added separately.

| Wax Added | Wax Type | Wax % | SP | pen | visc |
|---|---|---|---|---|---|
| Bareco PX 105 | Fisher Tropsch | 3 | 190 F. (88 C.) | 15 dmm | 154 cps |
| OR Honeywell AC6 | Polyethylene (PE) | 3 | 192 F. (89 C.) | 14 dmm | 195 cps |
| OR Honeywell 392 | Oxidized PE | 3 | 199 F. (93 C.) | 15 dmm | 110 cps |

The properties of the waxes used in the examples are given in the following table.

| Wax | Melt Point | Hardness | Density | Viscosity |
|---|---|---|---|---|
| Bareco PX-105 | 221 F. (105 C.) | 1 dmm | N/A | 110 SUS at 99 C. |
| Honeywell AC6 | 223 F. (106 C.) | 4 dmm | 0.92 g/cc | 375 cps @ 140 C. |
| Honeywell AC392 | 280 F. (138 C.) | <0.5 dmm | 0.99 g/cc | 4500 cps @ 150 C. |
| Honeywell AC617 | 213 F. (101 C.) | 7 dmm | 0.91 g/cc | 180 cps @ 140 C. |
| Honeywell AC16A | 215 F. (102 C.) | 5.5 dmm | 0.91 g/cc | 525 cps @ 140 C. |

The principle and mode of operation of this method have been described in its preferred embodiments. However, it should be noted that the method may be practiced otherwise than as specifically described without departing from its scope.

For example, although the method has been described in relation to the production of a coating asphalt for a roofing shingle, the method is also suitable for producing a built up roofing asphalt (BURA). Built up roofing asphalt specifications are set forth in ASTM D 312.

What is claimed is:

1. A method of producing a roofing shingle coating asphalt from a non-coating grade asphalt feedstock comprising the following steps:
   partially blowing the non-coating grade asphalt feedstock to lower its penetration to a first penetration that is within or close to a target penetration range of the coating asphalt, and to raise its softening point to a first softening point that is lower than a target softening point range of the coating asphalt;
   adding a blowing catalyst to the non-coating grade asphalt before or during the blowing; and then
   adding a wax to the partially blown non-coating grade asphalt to further raise its softening point to a second softening point that is within the target softening point range, to produce the coating asphalt, wherein the wax has a melt point of at least about 90° C.

2. The method of claim 1 wherein the first penetration is within the target penetration range.

3. The method of claim 1 wherein the first penetration is higher than the target penetration range, and wherein the wax addition step further lowers the penetration to a second penetration that is within the target penetration range.

4. The method of claim 1 wherein the first penetration is lower than the target penetration range, and wherein the wax addition step raises the penetration to a second penetration that is within the target penetration range.

5. The method of claim 1 wherein the non-coating grade asphalt feedstock is a commodity paving asphalt.

6. The method of claim 5 wherein the non-coating grade asphalt feedstock is a PG64-22 grade asphalt and/or an AC20 grade asphalt.

7. The method of claim 5 wherein the method is suitable for use with all of the following asphalts: PG64-22, PG67-22, PG-70-22, PG58-22, PG70-16, PG70-10, PG67-10, pen grade 40-50, pen grade 60-70, pen grade 85-100, pen grade 120-150, AR4000, AR8000, AC20 grade and AC30 grade.

8. The method of claim 1 wherein the non-coating grade asphalt feedstock consists essentially of the asphalt.

9. The method of claim 1 wherein the wax has a melting point of at least about 100° C.

10. The method of claim 9 wherein the wax is Fischer-Tropsch wax, polyethylene wax and/or oxidized polyethylene wax.

11. The method of claim 1 wherein the wax is added in an amount within a range of from about 0.5% to about 5% by total weight of the wax and the asphalt.

12. The method of claim 1 wherein the first softening point is within a range of from about 140° F. (60° C.) to about 200° F. (93° C.).

13. The method of claim 12 wherein the first softening point is within a range of from about 150° F. (66° C.) to about 180° F. (82° C.).

14. The method of claim 1 wherein the coating asphalt has a weatherability that is improved compared to the same asphalt blown to the second softening point.

15. The method of claim 1 wherein the partial blowing reduces blow time and resulting emissions at least about 20% compared to blowing the same feedstock asphalt to the target softening point range.

16. The method of claim 1 wherein the coating asphalt has a stain index less than 10.

17. The method of claim 1 wherein the coating asphalt has storage stability such that the softening point changes less than 3% when stored at 500° F. (260° C.) for three days.

18. The method of claim 1 wherein the addition of the catalyst expands the asphalt feedstocks that can be made into the coating asphalt, and adjusts the melt viscosity of the product coating asphalt.

19. The method of claim 1 wherein the blowing catalyst is phosphoric acid.

20. The method of claim 19 wherein the step of partially blowing with the phosphoric acid and the wax addition step have a synergistic effect in raising the softening point.

21. The method of claim 19 wherein the blowing catalyst is added in an amount within a range of from about 0.1% to about 5% by total weight of the asphalt and blowing catalyst.

22. The method of claim 1 wherein the partial blowing step raises the melt viscosity of the asphalt, and wherein the more blowing catalyst is used the more the melt viscosity is raised.

23. The method of claim 1 wherein the melt viscosity of the product coating asphalt is controlled to the desired level by adjusting the amount of catalyst added to the asphalt.

24. The method of claim 1 wherein the more blowing catalyst used in the partial blowing step the less the penetration is lowered, allowing a wider variety of asphalt feedstocks to be used in the process.

25. A method of producing a roofing shingle coating asphalt from a non-coating grade asphalt feedstock comprising the following steps:
partially blowing the non-coating grade asphalt feedstock to lower its penetration to a first penetration that is within or close to a target penetration range of the coating asphalt, and to raise its softening point to a first softening point that is lower than a target softening point range of the coating asphalt; and then
adding a wax to the partially blown non-coating grade asphalt to further raise its softening point to a second softening point that is within the target softening point range to produce the coating asphalt, wherein the wax has a melt point of at least about 90° C.

26. The method of claim 25 wherein the first penetration is within the target penetration range.

27. The method of claim 25 wherein the non-coating grade asphalt feedstock is a commodity paving asphalt.

28. The method of claim 25 wherein the wax has a melting point of at least about 100° C.

29. The method of claim 25 wherein the first softening point is within a range of from about 140° F. (60° C.) to about 200° F. (93° C.).

30. A method of producing a roofing shingle coating asphalt from a non-coating grade asphalt feedstock comprising the following steps:
blowing the non-coating grade asphalt feedstock;
adding a blowing catalyst to the non-coating grade asphalt before or during the blowing; and then
adding a wax to the blown asphalt to produce the roofing asphalt, wherein the wax has a melt point of at least about 90° C.;
the method providing independent control of the softening point, penetration, and melt viscosity of the coating asphalt while delivering excellent stain index and storage stability.

31. The method of claim 30 wherein the blowing step controls the penetration of the coating asphalt.

32. The method of claim 30 wherein the amount of the blowing catalyst added controls the melt viscosity of the coating asphalt.

33. The method of claim 30 wherein the amount of the wax added controls the softening point of the coating asphalt.

34. The method of claim 30 wherein the blowing step comprises partially blowing the non-coating grade asphalt feedstock to lower its penetration to a first penetration that is within or close to a target penetration range of the coating asphalt, and to raise its softening point to a first softening point that is lower than a target softening point range of the coating asphalt.

35. The method of claim 30 wherein the wax addition step further raises the softening point to a second softening point that is within the target softening point range.

36. A method of achieving improved control over final softening point, penetration and viscosity properties in a roofing shingle coating asphalt made from a non- coating grade asphalt feedstock, the method comprising the following steps:
blowing the non-coating grade asphalt feedstock in the presence of a blowing catalyst to lower its penetration to a first penetration that is within or close to a target penetration range of the coating asphalt, and stopping the blowing when the softening point is at a first softening point that is lower than a target softening point range of the coating asphalt; and
adding a wax to the blown asphalt to further raise its softening point to a second softening point that is within the target softening point range, to produce the coating asphalt, wherein the wax has a melt point of at least about 90° C.

* * * * *